United States Patent
Wang et al.

(10) Patent No.: US 6,571,228 B1
(45) Date of Patent: May 27, 2003

(54) HYBRID NEURAL NETWORKS FOR COLOR IDENTIFICATION

(76) Inventors: Po-Tong Wang, PO Box 82-144, Taipei (TW); Ching-Han Chen, PO Box 82-144, Taipei (TW)

( * ) Notice: Subject to any disclaimer, the term of this patent is extended or adjusted under 35 U.S.C. 154(b) by 401 days.

(21) Appl. No.: 09/635,071

(22) Filed: Aug. 9, 2000

(51) Int. Cl.[7] ............................................. G06F 15/18
(52) U.S. Cl. ............................ 706/16; 706/20; 706/21; 706/25
(58) Field of Search ............................ 706/16, 20, 21, 706/25

(56) References Cited

U.S. PATENT DOCUMENTS 6,314,413 B1 * 11/2001 Otte ............................ 706/15
6,453,246 B1 * 9/2002 Agrafiotis et al. ............ 702/27
6,505,181 B1 * 1/2003 Lambert et al. .............. 706/20

OTHER PUBLICATIONS

Fung et al, "Modular Artificial Neural Network for Prediction of Petrophysical properties from well Log Data", IEEE Instrumentation and Measurement Technology Conference, Jun. 1996.*

* cited by examiner

*Primary Examiner*—George B. Davis
(74) *Attorney, Agent, or Firm*—Leong C. Lei

(57) ABSTRACT

A method uses a hybrid neural network including a self organizing mapping neural network (SOM NN) and a, back-propagation neural network (BP NN) for color identification. In the method the red, green and blue (RGB) of color samples are input as features of training samples and are automatically classified by way of SOM NN. Afterwards, the outcomes of SOM NN are respectively delivered to various BP NN for further learning; and the map relationship of the input and the output defines the X,Y, Z corresponding the x, y and z values of a coordinate system of the standard color samples of RGB and IT8. By way of the above learning structure, a non-linear model of color identification can be set up. After color samples are self organized and classified by SOM NN network, data can be categorized in clusters as a result of characteristic difference thereof. Then the data are respectively sent to BP NN for learning whereby-the learning system not only can be quickly converged but also lower error discrepancy in operation effectively.

12 Claims, 3 Drawing Sheets

HYBRID NEURAL NETWORKS FOR COLOR IDENTIFICATION

FIELD OF THE INVENTION

This invention presents a method using a hybrid neural networks including a self-organizing mapping neural network (SOM NN) and a back-propagation neural network (BP NN) for color identification. In the method RGBs ( red, green, blue) of color samples are input as features of training samples and are classified by SOM NN. Afterwards, the outputs of SOM NN are respectively delivered to various BP NN for further learning; and RGBs of the color samples onto corresponding XYZs of IT8. By the way of the above learning structure, a non-linear model of color identification can be set up. After color samples are self-organized-and classified by SOM NN, data can be categorized in clusters as a result of characteristic-difference thereof. Then the data are transmitted to BP NN. This learning system not only can be quickly converged but also lower error discrepancy in operation effectively.

This invention could be widely applied in color quality control and color proof task. No matter in the printing industry, scanner and CCD (charge coupled device) that are image processing devices and must be connected to the above equipment responsible for color quality control and proof task whereby color discrepancy and mal-quality problems can be overcome. In particular, color is not linear data in nature and the discrepancy in brightness and color hue can not be simply solved by linear approaches, or image infidelity can be more serious in practical operation.

SUMMARY OF THE INVENTION

Therefore, the primary object of the present invention is to provide a device a method using a hybrid neural networks, including a self-organizing mapping neural network (SOM NN) and a back-propagation neural network ( BP NN), for RGBs to XYZs color transformation. This technique could apply for color identification, color quality control and color proof task. SOM NN could classify input RGBs to different categories. Each categories of SOM NN will link a BP NN to perform a supervising learning. The learning cycle will stop until reaching a desired inferred XYZs.

Anther object of this invention is to provide a method for color identification using a intelligent system to process color calibration in error tolerance, self-organization and efficiency. This technique reveals a new intelligent solution to solve a color complex problem. This technique actually superiors to a traditional color transformation like a 3×3 matrix.

One further object of the present invention is to provide method for color identification wherein self-learning process can continue in BP NN until a preset termination condition is met in each BP NN for satisfactory color identification.

DETAILED DESCRIPTION OF THE PREFERRED EMBODIMENTS

The present invention relates to a method of color identification by way of neural networks. The color identification system including a color image input device, a self organizing mapping neural network (SOM NN) and a back-propagation neural network(BP NN) and a color output device. The color image input device is working with SOM NN and BP NN then connected to the color output device.

The presenting color identification includes the following steps:

Step 1: obtaining RGBs (red, green, blue) of a color sample and their values of discrepancy, serving as input of a neural network; then digitalizing color images by a image input device transforming said color images into a digital form acceptable by a computer; then measuring color features thereof by two set of different region description devices for use of automatic sorting by means of said SOM NN;

Step 2: transmitting respectively output neurons of an identical kind to BP NN according to a sorting result of SOM NN for supervising learning; and mapping outputs of said learning being X, Y, Z of a (x,y,z) coordinate of standard color samples of IT8; after repeated learning procedures, a final learning procedure is reached only when a preset learning termination condition is met.

Figure 1:
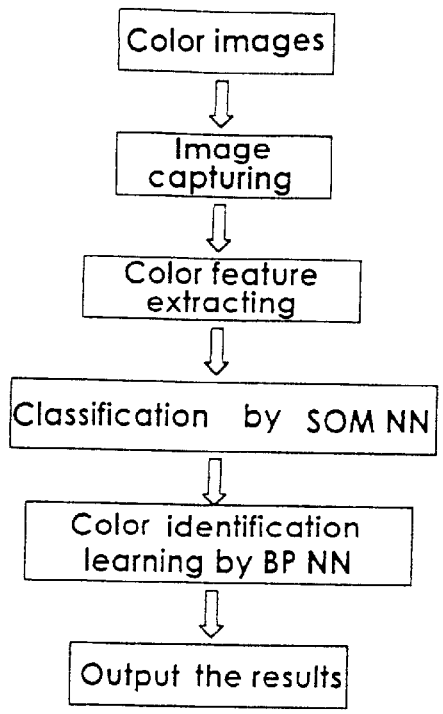
FIG. 1 is a flow of the present invention.

Referring to FIG. 1, it is a method of evaluation and proof of color qualities. Its image input device can be a scanner, a CCD (charge-coupled device) camera, CMOS (Complementary Metal Oxide Semi-conductor) image sensor, a color sensor. First, color images 1, color samples 2 are processed to obtain color features 3 for use in automatic sorting performed by SOM NN 4. The outcome of the sorting operation is then delivered to BP NN 5 for learning. After the learning procedure, the output 6 from the BP NN serves as a inferred knowledge model.

Figure 2:
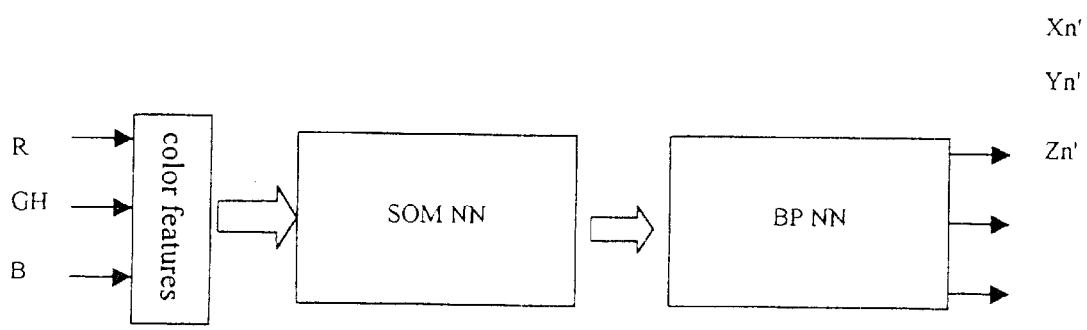
FIG. 2 is a diagram showing SOM NN and BP NN for color identification.

Referring further to FIG. 2, the neural networks are used to monitor the testing of color samples (RGBs), and then color features 7 is further transmitted to SOM NN 8 and BP NN 9. After the learning, the outputs Xn', Yn', Zn' are the results of color identification.

The color features are performed by way of two region description devices of different function measuring on color character values in following steps:

(1) a first set of the region description device adopts 4-stage previous statistical momentum:

a. Mean value for evaluation of intensity of mean gray level of an image area block;

b. Variance value for description of a degree of dispersion of gray level of an area block;

c. Skewness value for measurement of symmetry of a linear square diagram of gray level;

d. Kurtosis value for measurement of a drawing mode of a gray level distribution;

(2). Another set of region description device makes use of 5 specific statistical distribution values of said linear square diagram of gray level:

a. Non-zero maximum gray level value on said linear square diagram;

b. Non-zero minimum gray level value on said linear square diagram;

c. Middle position numbers;

d. Multiple numbers;

e. Full distance.

Figure 3:
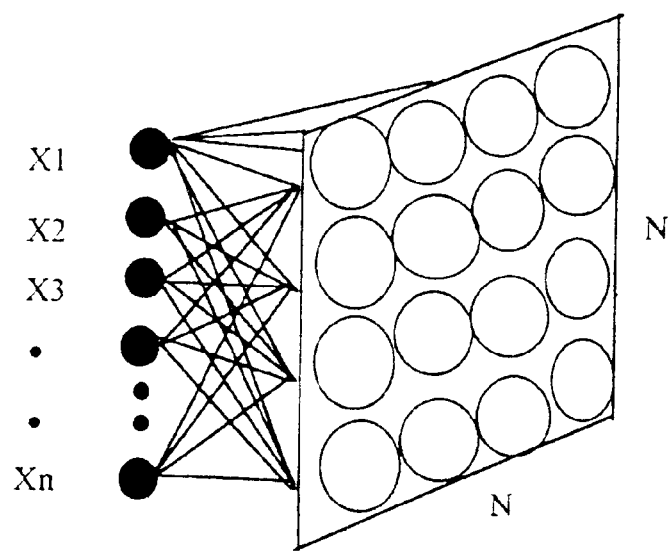
FIG. 3 is a diagram showing SOM NN structure.
Figure 4:
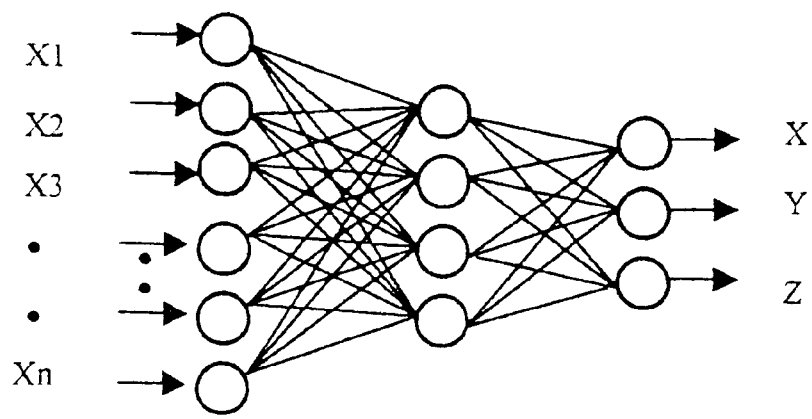
FIG. 4 is a diagram showing SOM NN structure.
Figure 5:
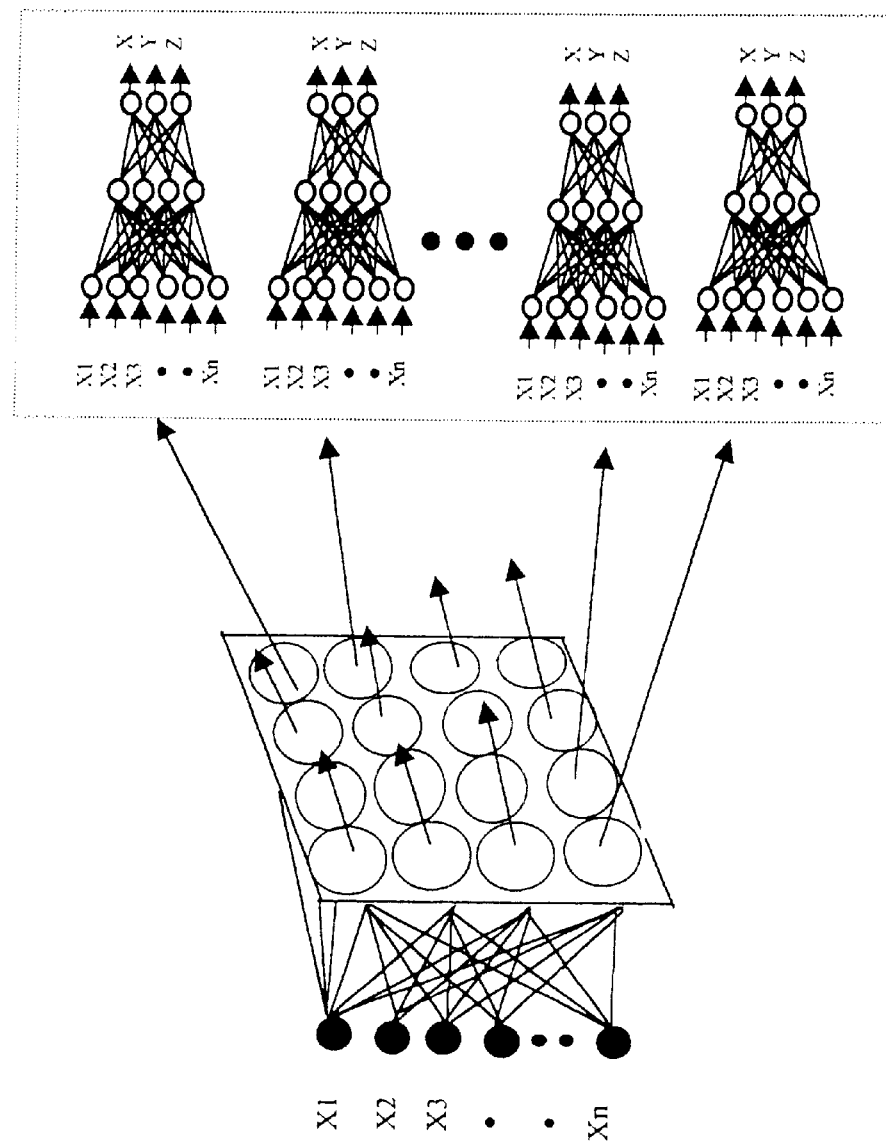
FIG. 5 is a diagram illustrating a learning architectures of a hybrid neural networks (SOM NN+BP NN).

Referring to FIGS. 3, 4, the structure of SOM NN and BP NN is illustrated. SOM NN extracts color features of color samples as input vectors and sets numbers of mapping output layers and system learning parameters so as to allow automatic sorting operation to be performed thereby. In addition to selection of IT8 BP NN can take tri-stimulating X, Y, Z values of a xyz coordinate obtained by a spectrometer for color identification of a sample in a mapping output of a learning process. SOM NN has a learning rule set as below:

setting a number of output layers initial neighboring, region $N_c$ (0) and a node value $W_i$( 0)

seeking a winning neurons c having a smallest distance from an input feature vector X, i.e.:

$$\|X-W_c\|=\min\{\|X-W_i\|\} \, Wi(t)+\alpha(t)[X(t)-Wi(t)] \text{ if } i\in N_c(t)$$

and $$Wi(t+1)=Wi(t) \text{ if } i\notin N_c(t)$$

Wherein $\alpha(t)$ is learning rate, and $\alpha(t)$ and neighboring region $N_c$ (t) are decreasing function with time in a learning process.

BP NN has a learning rule set as below:

taking a sigmoid function as a conversion function and $$O = \frac{1}{1 + e^{-(\Sigma wX+bias)}}$$

wherein O is an output value of said conversion function, w is weight X is an input unit; w and bias vector has a randomly given initial value; said w eight has a renewal rule as below:

$$\Delta w(n)=-\epsilon\partial E/\partial w+\alpha\Delta w(n-1)$$

wherein said $\alpha$ is an inertial factor, E is an MSE(sum of errors' square). Furthermore, the output Xn', Yn', Zn' of BP NN after a learning process are outcomes of color identification. For competition type learning principles including a clustering algorithm such as K-means, fuzzy c-means or vector quantization are used for automatic classification; and then BP NN is integrated for supervising type learning to carry out color space transformation.

In addition, the number of output layer neurons of SOM NN and learning parameters can be adjustable to modify the learning process in order to improve the accuracy of color identification.

We claim:

1. A method of color identification by way of neural networks, wherein:

a color identification system comprises a color image input device, a self organizing mapping neural network (SOM NN) and a back-propagation neural network (BP NN) and a color output device;

said color image input device is connected to said SOM NN and said BP NN network is connected to said color output device;

said method includes the following steps:

Step 1: digitalizing color images by way of said image input device transforming said color images into a form acceptable by a computer; then extracting color features thereof by two sets of different region description devices for automatic classification by means of said SOM NN;

Step 2: transmitting respectively output neuron samples of an identical kind from SOM NN to said BP NN, according to a sorting result of said SOM NN for supervision type learning; and mapping outputs of said learning being X, Y, Z of a (x,y,z) coordinate of standard color samples of IT8; after the above learning procedures, a final learning procedure is reached only when a preset learning termination condition is met.

2. The method of color identification as claimed in claim 1 wherein said color image input device is a scanner.

3. The method of color identification as claimed in claim 1 wherein said color image input device is a CCD (charge-coupled device) camera.

4. The method of color identification as claimed in claim 1 wherein said color image input device is a color sensor.

5. The method of color identification as claimed in claim 1 wherein:

Color features are extracted by way of two region description devices of different functions which measures on color character values in following steps:

A. A first set of said region description device adopts 4-stage previous statistical momentum:
      1-stage: A mean value for evaluation of intensity of mean gray level of an image area block;
      2-stage: A variance value for description of a degree of dispersion of gray level of an area block;
      3-stage: A skewness value for measurement of symmetry of a linear square diagram of gray level;
      4-stage: A kurtosis value for measurement of a drawing mode of a gravy level distribution;

B. Another set of region description device makes use of 5 specific statistical distribution values of said linear square diagram of gray level:
      (1) A non-zero maximum gray level value on said linear square diagram;
      (2) A non-zero minimum gray level value on said linear square diagram;
      (3) A middle position number;
      (4) Multiple numbers;
      (5) A full distance.

6. The method of color identification as claimed in claim 1 wherein said SOM NN extracts features of color samples as input vectors and sets numbers of mapping output layers and system learning parameters so as to allow automatic classification to be performed thereby.

7. The method of color identification as claimed in claim 1 wherein said BP NN can take tri-stimulating X,Y, Z values of a xyz coordinate obtained by way of a spectrometer for color identification of a sample instead of choice of IT8 in a mapping output of a learning process.

8. The method of color identification as claimed in claim 1 wherein said SOM NN has a learning rule set as below:

Setting a number of output layers, initial neighboring region $N_c(0)$ and a node value $W_i(0)$:

Seeking a winning neuron c, having a smallest distance from an input feature vector X, i.e.;

$$\|X-W_c\|=\min\{\|X-W_i\|\} \, Wi(t)+\alpha(t)[X(t)-Wi(t)] \text{ if } i\in N_c(t)$$

and $$Wi(t+1)=Wi(t) \text{ if } i\notin N_c(t)$$

Wherein $\alpha(t)$ is learning rate, and $\alpha(t)$ and neighboring region $N_c(t)$ are decreasing function with time in a learning process.

9. The method of color identification as claimed in claim 1 wherein said BP NN has a learning rule set as below:

taking a sigmoid function as a conversion function and $$O = \frac{1}{1 + e^{-(\Sigma wX + bias)}}$$

wherein O is an output value of said conversion function, w is a weight, X is an input unit; w and bias sector has a randomly given initial value; said weight has a renewal rule as below:

$$\Delta w(n) = -\epsilon \partial E/\partial w + \alpha \Delta w(n-1)$$

wherein said $\alpha$ is an inertial factor, E is an MSE (sum of errors' square).

10. The method of color identification as claimed in claim 1 wherein output Xn', Yn', Zn' of said BP NN after a learning process are outcomes of color identification.

11. The method of color identification as claimed in claim 1 wherein competition type learning principles including a clustering algorithm such as K-means, fuzzy c-means or vector quantization are used for automatic classification; and then said BP NN is integrated for supervising type learning to carry out color space transformation.

12. The method of color identification as claimed in claim 1 wherein said the number of output layer neurons of said SOM NN and learning parameters are adjusted to repeat a learning process when an outcome of said color identification system is not acceptable until a satisfactory outcome is obtained.

* * * * *